Oct. 20, 1925.  
C. W. WATSON  
1,558,067  
MANUFACTURE OF ARTICLES CENTRIFUGALLY  
Filed June 20, 1923 6 Sheets-Sheet 2
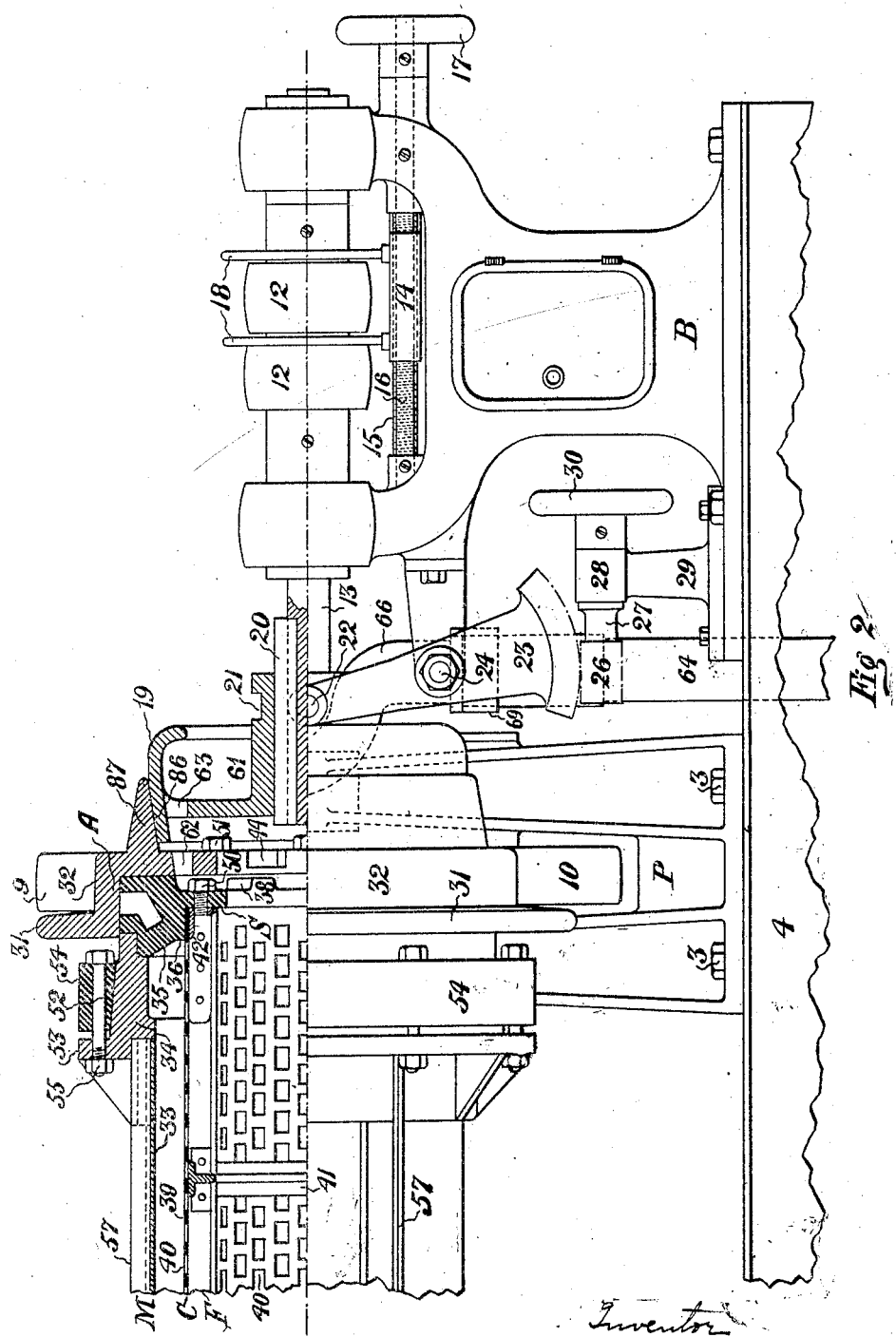

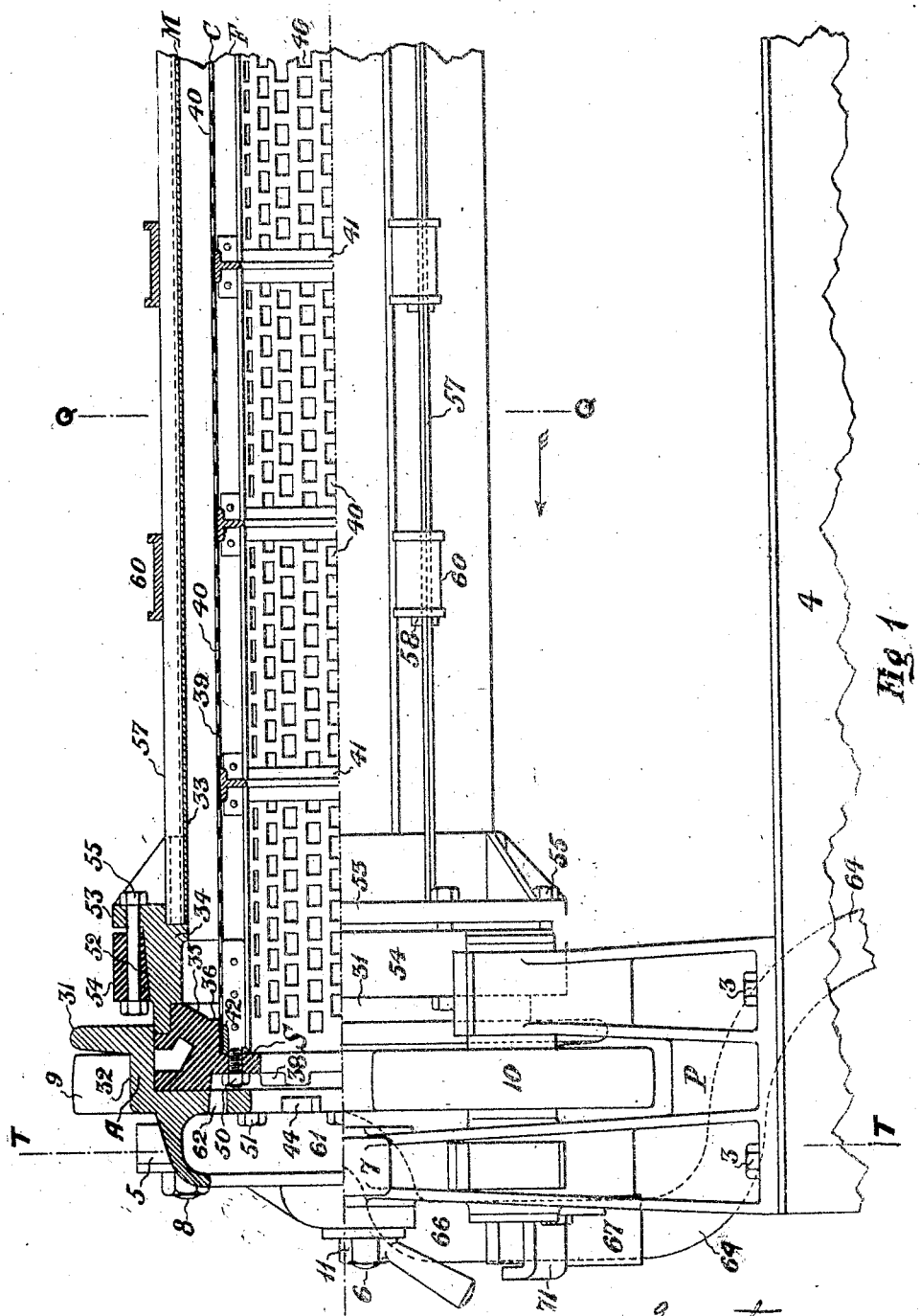

Oct. 20, 1925.
C. W. WATSON
1,558,067
MANUFACTURE OF ARTICLES CENTRIFUGALLY
Filed June 20, 1925   6 Sheets-Sheet 3
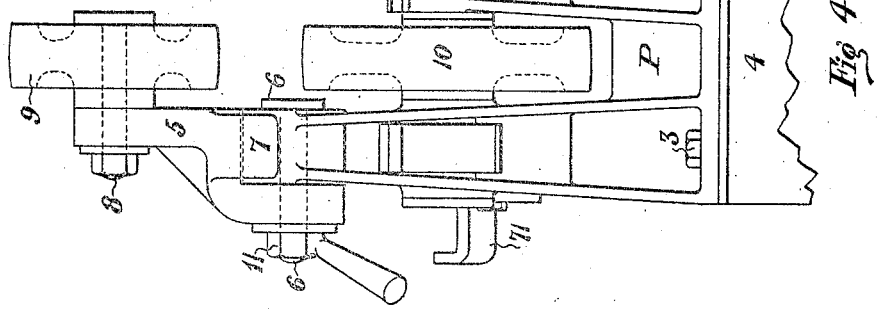
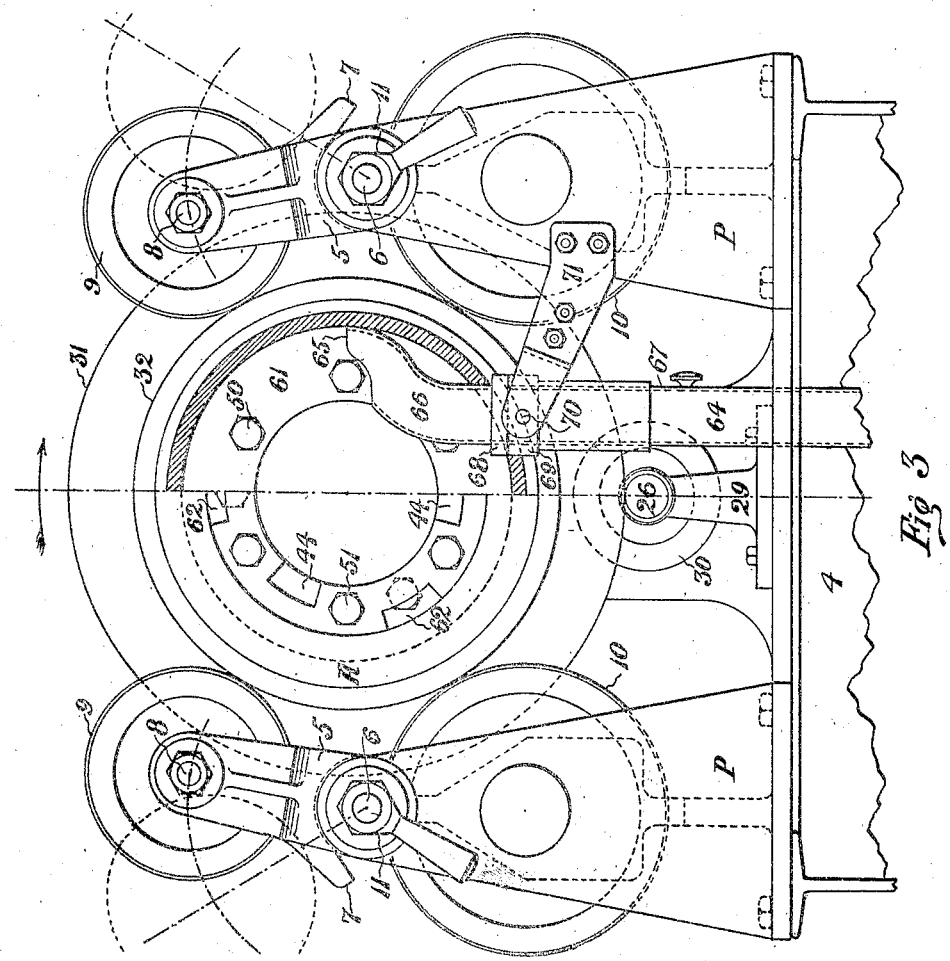

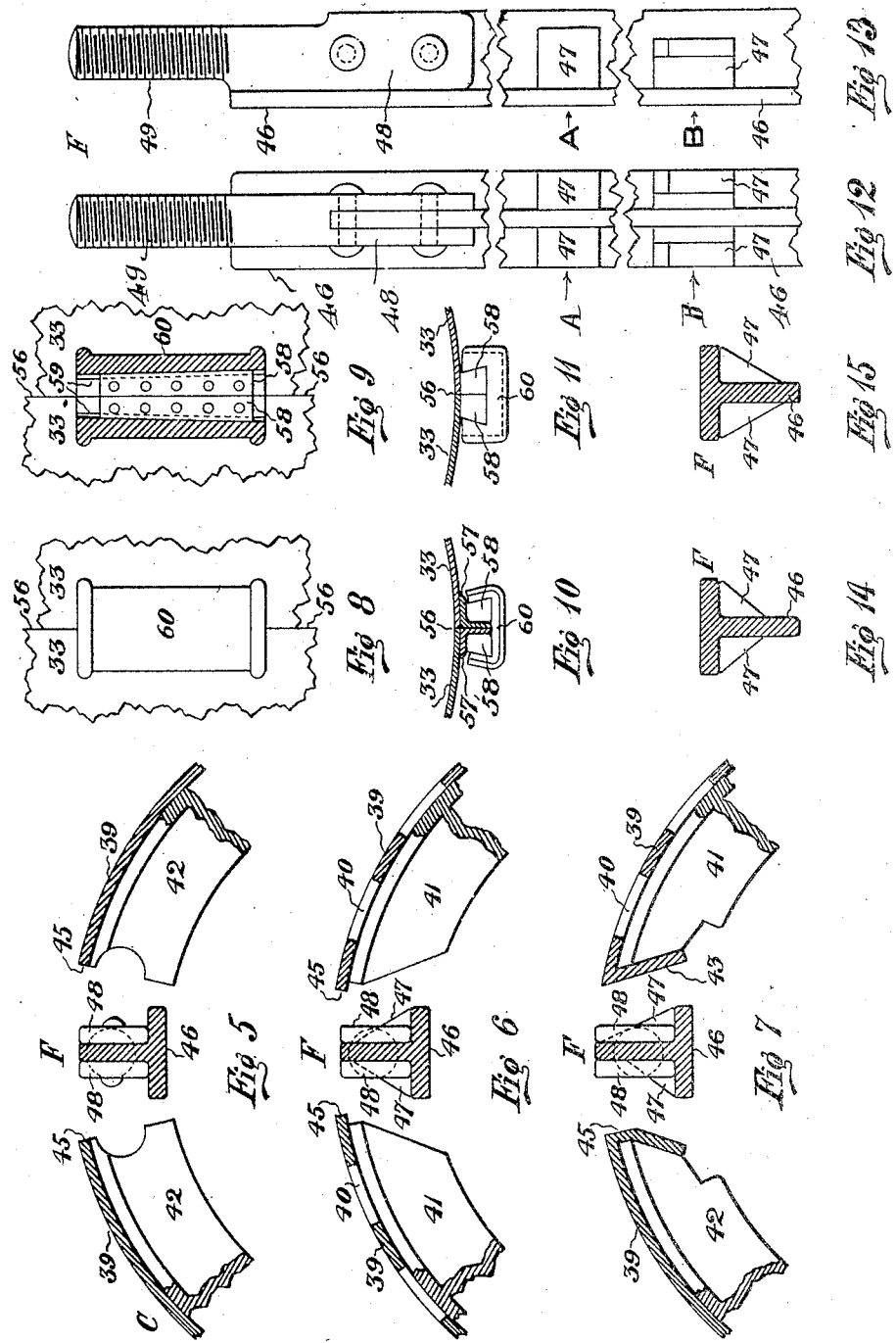

Oct. 20, 1925.  1,558,067
C. W. WATSON
MANUFACTURE OF ARTICLES CENTRIFUGALLY
Filed June 20, 1923   6 Sheets-Sheet 5
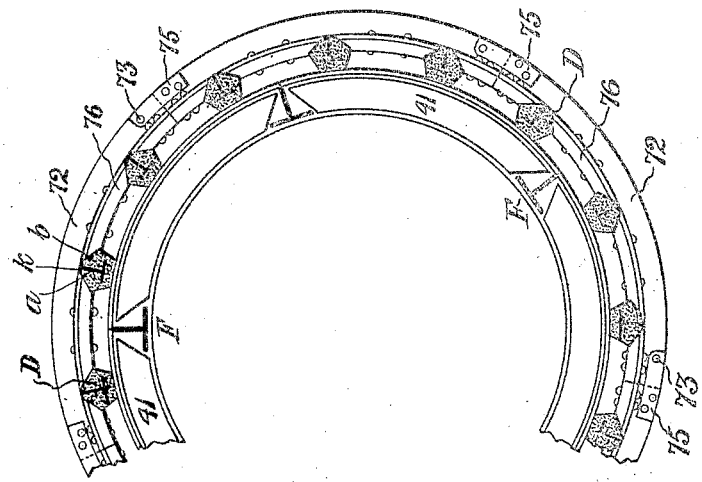
Fig. 18
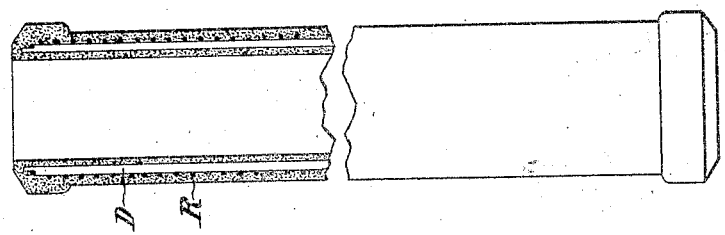
Fig. 19
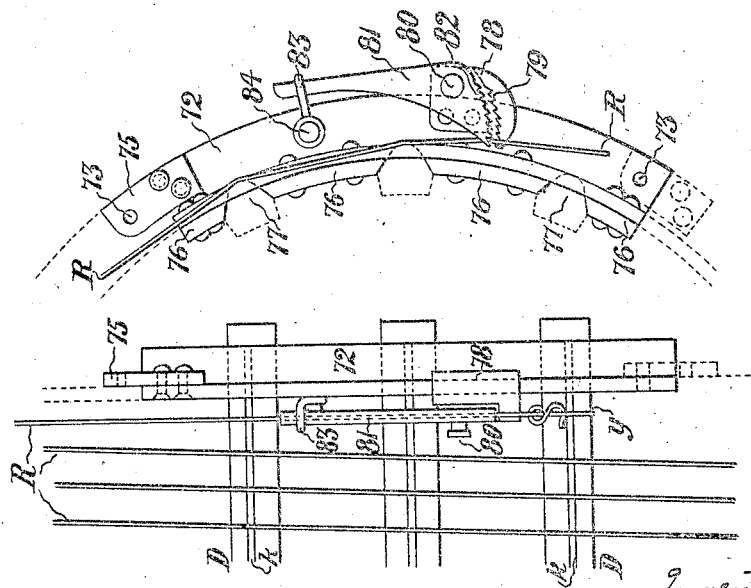
Fig. 17
Fig. 16
Inventor
Charles W. Watson
by W. H. Babcock & Son
Attorneys

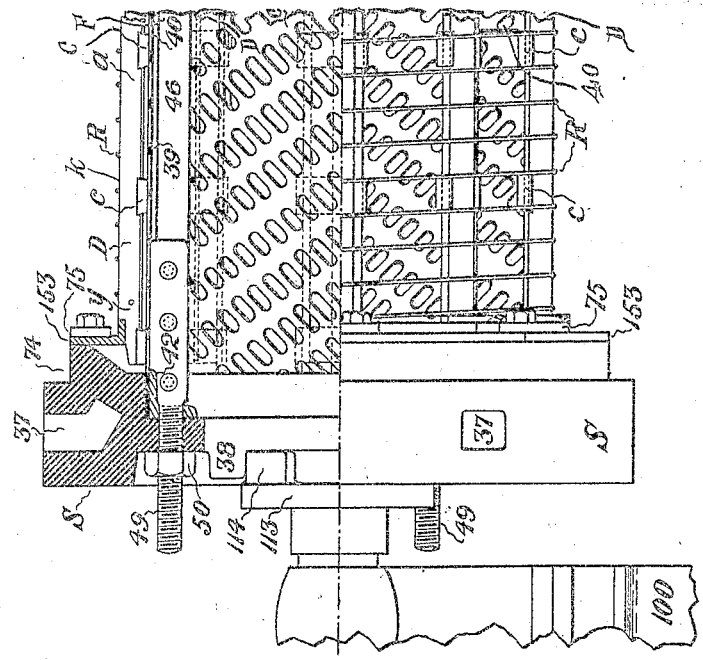
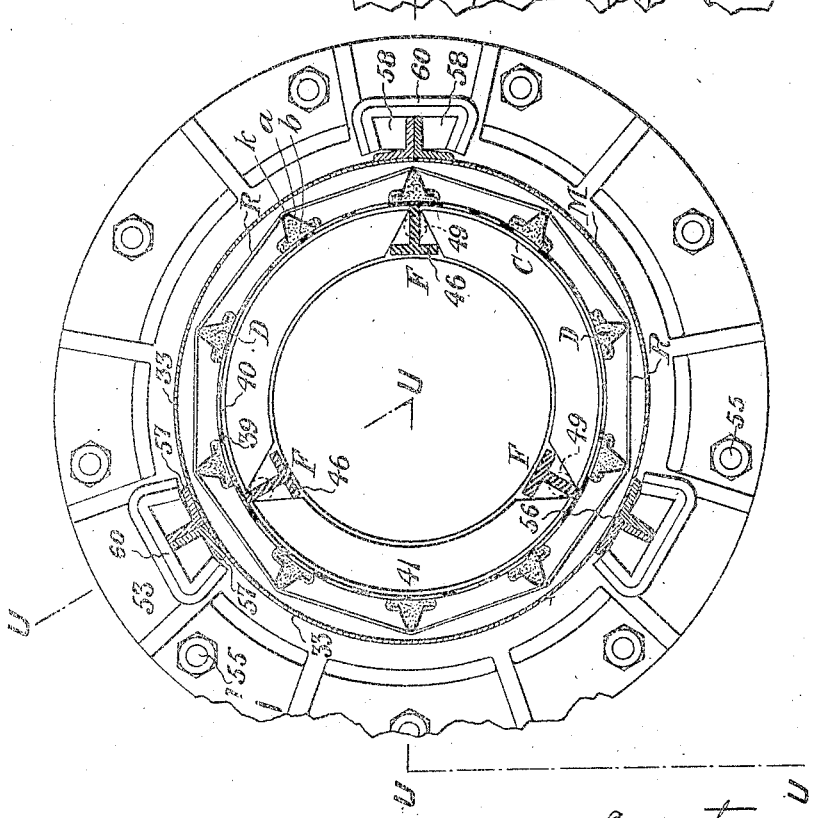

Patented Oct. 20, 1925.

1,558,067

UNITED STATES PATENT OFFICE.

CHARLES WILLIAM WATSON, OF ST. KILDA, VICTORIA, AUSTRALIA.

MANUFACTURE OF ARTICLES CENTRIFUGALLY.

Application filed June 20, 1923. Serial No. 646,727.

*To all whom it may concern:*

Be it known that I, CHARLES WILLIAM WATSON, a subject of the King of Great Britain and Ireland, residing at 1 York Street, Saint Kilda, in the State of Victoria, Commonwealth of Australia, have invented certain new and useful Improvements Relating to the Manufacture of Articles Centrifugally; and I do hereby declare the following to be a full, clear, and exact description of the invention, such as will enable others skilled in the art to which it appertains to make and use the same.

In the centrifugal manufacture of reinforced concrete structures difficulty and loss have been experienced owing to the reinforcement becoming displaced or deformed during the centrifugal action. The agglomerate covering the reinforcement has been thicker at some parts than at others and there has been longitudinal spreading of or alteration of pitch of the reinforcement helices of convolutions, as well as diametral variations. Structures (pipes for instance) so made have been found wanting in durability, unsuitable for resistance to high internal pressure, and generally unreliable.

My invention is intended to overcome defects such as have been referred to, and relates to the manufacture of structures of plastic material, such as cement agglomerate, particularly those with embedded reinforcement, but is also applicable to the manufacture of non-reinforced structures, and includes improvements as hereinafter indicated. By reinforcement I shall refer to wire or the like, to distinguish it from other material to be embedded in plastic material although in fact such other material will have great strengthening effect and thus be a form of reinforcement.

In the manufacture of helically reinforced hollow structures the distribution of the reinforcement and the pitch of the helices should be uniform, while the winding should be concentric with the external and internal peripheries of the agglomerate structure, and should not be liable to either displacement or deformation.

A suitable tension of reinforcement should be retained throughout, so as to produce structures of uniform strength. To obtain such or substantially such results lies within the ambit of my invention, which enables structures of great strength to be made having the tensioned reinforcement arranged to contact with keepers or bars, both reinforcement and keepers or bars retaining a predetermined position, or substantially so, during and after the period of centrifugal consolidation.

In the specification hereinafter mentioned of my concurrent application for a United States Patent Ser. No. 646,726 for my invention of method of and machine for spacing tensioning and coiling material such as wire I refer to the provision of means for feeding to, and positioning relatively to, keepers or bars, disposed around a core, a tensioned reinforcement, or plurality of reinforcements, in intimate contact with each other, or separated as required, having convolutions of predetermined pitch. The pitch is maintained or at will altered by mechanism controlling the rate of travel of a reinforcement carrier. I also refer in the specification of the said invention to the provision of reinforcement spacing, feeding, and securing means.

By the present invention I provide rotary configuring elements; drainage means; and driving mechanism. The invention includes other features of novelty, as indicated in the following description and claims.

In this specification, cement or cements or cementitious or like material, used separately or associated with another constituent or constituents, is or are included in and referred to generally as agglomerate; the term mould refers to the outer configuring means distinguishing it from the core or inner configuring element; and the term ferruginous is used to indicate not only iron, steel or compounds thereof; but for brevity, any known suitable material which may be used instead, and retainers refers to keepers or bars, or the equivalent which preserve or maintain the position, and the spacing, of a reinforcement.

In the specification of a concurrent application for a United States Patent Ser. No. 646,725 I have described and claimed an invention entitled "Reinforcements for concrete and the like." That invention relates to keepers or bars, also called by me retainers, to be used in conjunction with wire reinforcement coiled into proper position relatively to the said retainers, and in the specification of a concurrent application for a United States patent I have described and claimed an invention entitled "Method of and machine for spacing, tensioning, and coiling material such as wire."

By means of the latter invention the wire, which I call for brevity reinforcement, can be set accurately in position. Then by using the present invention concrete or like plastic material may be combined with the retainers and the wire reinforcement and thus produce desired structures by centrifugal action.

In the accompanying drawings an embodiment of the invention is diagrammatically illustrated as applied to the manufacture of a pipe by way of example. The invention however is not limited thereto, or to details which obviously can be modified while keeping within the scope of my claims. Like reference characters designate corresponding parts in these views.

The figures are as follows:—

Figure 1—Partly sectional elevation of portion of my moulding machine.

Figure 2—Partly sectional elevation continuing Figure 1 showing the driving end of the said machine, omitting the near roller pedestal.

Figure 3—Partly front and partly sectional elevation on line T—T of Figure 1.

Figure 4—Side elevation of a pedestal and rollers.

Figure 5—Cross sections of portions of core and butt-jointed angle-plates, shown separated.

Figure 6—Cross sections of portions of core and butt-jointed stiffeners, shown separated.

Figure 7—Cross sections of portions of modified core, angled plates, and stiffeners, shown separated.

Figure 8—Elevation of a mould wedge joint.

Figure 9—Part elevation and part longitudinal vertical section of a mould wedge joint.

Figure 10—Partly sectional view showing a mould wedge joint.

Figure 11—Partly sectional view showing another type of mould wedge joint.

Figure 12—Front view of one form of locking bar.

Figure 13—Side view of the parts in Figure 12.

Figure 14—Cross section of a locking bar, at A in Figures 12 and 13, this bar also appearing in Figure 6.

Figure 15—Cross section of a locking bar, at B in Figures 12 and 13.

Figures 16 and 17—Plan and side view respectively of part of a positioning ring, and reinforcement holder.

Figure 18—Sectional view of part of a core showing positioning rings, and retainers.

Figure 19 shows an elevation, partly sectional of a pipe containing helical reinforcement embedded in concrete.

Figure 20—End sectional view of a rotor on line Q—Q of Figure 1 and showing another type of retainer.

Figure 21—Front elevation showing an end of the rotor mounted on part of the driving head of a reinforcement winding mechanism.

My illustrated moulding machine consists of stationary and power transmitting elements and adjuncts (for brevity called a stator) and rotary moulding mechanism and adjuncts (for brevity called a rotor). This machine is applicable for the production of plain, or non-reinforced, as well as of reinforced concrete structures; in each case agglomerate is moulded between enclosing elements.

A series of bars D is so arranged as to keep and retain in predetermined position a contacting reinforcement R having convolutions, whether said retainers superpose or be superposed by the reinforcement. The bars may be composite, with or without a ferruginous element, or they may consist of only one material. For convenience the bars will hereinafter be referred to as retainers.

The specification of the concurrent patent application aforesaid as to "reinforcements for concrete and the like" describes suitable retainers. Some particulars however of such retainers are for a convenient understanding of the present invention hereinafter stated.

Some retainers D include a basic member $a$ of suitable material, for instance metal of any suitable form, and cross section, and a secondary member or members, $b$, of cementitious or agglomerate material of any suitable form and cross section, combined or associated therewith.

But in some structures it is not desirable, necessary, or convenient to employ a retainer having part of its basic member uncovered by the secondary element; I then use retainers having the basic member completely embedded in the secondary member.

The retainers are contoured to oppose tendencies to displacements of parts in the structure containing the retainers, and to this end are provided with suitable locking surfaces according to the movement to be opposed. The edge $k$ of the retainer with which reinforcement will contact may be flat, bulbous, mushroomed, or curved, in cross section. The said edge is recessed, notched, or serrated, where desired; and these recesses assist to grip reinforcement in position, and prevent the convolutions of the latter creeping; or spreading and thus altering the pitch. Similarly, agglomerate surfaces of retainers are at will provided with notches, grooves or the like.

On the stator bed or framing 4 are mounted pedestals P, adjustably secured by bolts 3 passing through selected holes in that framing, series of such holes extending transversely and longitudinally. The pedestals carry upper and lower rollers 9, 10, the horizontal distances between which can be increased or reduced, making the machine adaptable to the production of structures of various dimensions. Each pedestal has adjustable roller carriers 5 and a locking bolt 6, on which these carriers pivot, each carrier having a movement-limiting stop piece or the like 7, and shafts 8 carrying the upper rollers 9 which, after the rotor is positioned on the rollers 10, are when necessary swung into contact with an annulus A, nuts 11 being suitably tightened.

A driving gear base B, Figure 2, on framing 4, carries fast and loose driving pulleys 12 on the shaft 13, which also carries part of a clutch. Striking gear is provided, which includes a carrier member 14 having a threaded hole to receive a screwed travelling shaft 15 a roller carrier having arms 18 being thus slidable along a guide rod 16. A hand wheel 17 operates the shaft 15, which passes through bearings in arms carrying shaft 13, and winds through the threaded hole in the member 14, having the arms 18.

This striking gear prevents too rapid engagement of the clutch elements, and too sudden movement of the rotor.

A friction clutch as illustrated in Figure 2, or any other suitable clutch is used, such as a clutch of well known toothed type, with or without a collecting chamber (explained hereinafter), to transmit power to the rotor.

The clutch portion 19 has a collar which is slidable along the driving shaft 13, being held in proper relation thereto by a spline or feather 20 fixed to the shaft, the collar groove 21 being engaged by pins 22 of a worm 26 operated quadrant lever 23, pivoted at 24 to a bracket. The worm shaft 27 is mounted in a bearing 28 on a pedestal 29. The worm shaft is rotated by operating a hand wheel 30 to throw the clutch in and out of gear, the clutch surface 86 carried by a collar 21 engaging a female annulus 87 on the annulus A.

Each annulus A has a flange 31 and a roller path 32, with which the rollers 9, 10, co-operate.

Each end of the machine has similar members, but there will be at will any suitable modifications.

The mould, for centrifugal production of a pipe, for example, see Figures 1 and 2, includes a cylinder 33 to each end of which a configuring annulus 34 is secured as by rivets, these parts being formed at will of segments or arcs secured together.

At each end of the machine mould I locate a configuring element, as a circular seat S, each seat co-acting with the annulus A, to position mould arcs. Inner surfaces 35, 36, of seat S are shown shaped to form a jointing, or part of a jointing surface of the structure to be made.

These surfaces are shown partly oblique and partly straight, to produce, when two of the structures made are associated in line, a recess to receive jointing material.

The structure end forms and the forms of the seat surfaces will in practice vary.

The surface of seat S, with which core C contacts, functions as a guide and gauge for any scraper and/or smoother and finishing tool which may be used. Each seat (see Figure 21) has recesses, as at 37, to receive lifting hooks, or to enable the seat to function in a carrying capacity, as explained hereinafter; and each seat may be provided with clutching blocks, not shown, interlocking with recesses in annuli A.

On removal of the mould and/or core from the concrete structure, the latter should for a time be guarded against conditions tending to produce deformation; and, with this in view, the said structure can be positioned standing upon a seat S, and allowed to harden; or the structure and its seat or seats can be lowered into a tank of water, for example, for seasoning.

Clutch teeth, 38, are provided to engage teeth 114 of a reinforcement winding mechanism. Like teeth may however, if desired, be formed about the inner periphery of annuli A.

The core C includes a moulding element, shown as a shell 39, having perforations 40 of any suitable number, location, form, and size. To facilitate withdrawal of this shell after centrifugal moulding has been effected, I build it in some cases in segments arcs, and in sections in the longitudinal direction. This also facilitates making elongated structures or the like, the meeting edges of such arcs or sections of the core, as well as of the mould being constructed to ensure satisfactory joints.

I provide in some cases ribs 41 by which these arcs are stiffened; the ribs being of suitable, as T, section, with suitably angled end ribs 42. The arcs may be returned angularly, as at 43 or a rib is angularly returned but with a butt jointing portion 45, as in Figure 7. The corresponding ribs have their ends similarly shaped, to fit, of course. In Figures 5 and 6 the edges 45 of the shell 39 form butt joints. The shell 39, the angle plates 42, and stiffeners 41 form similar joints. The core arc ends are, see Figures 5 to 7, shaped to receive between them locking means as locking bars F, which extend along the core length. Locking bars carry where desired wedge plates or blocks 47. These bars will vary in design, and are of T or other suitable cross section; and during the manufacture of concrete articles they will oppose tendency of the arcs to centripetal movement.

The bars illustrated in Figures 12 and 13 have attached to them pieces 48 which have screw threaded ends 49 to pass between ends of butt jointed plates 42 through the seat S, and are locked by nuts 50.

Each end 49 may be long so as to pass through the annulus A, and be thereto locked by a nut. But as shown in Figure 2 each annulus A may be secured to a seat S by screw bolts 51. I may use suitable substitutes for these wedging bars, and form arc ends to correspond.

For instalment, removal, or other purposes, I provide in some cases rings, hooks, holes, or the like (not shown) on any mould, core arc, and / or locking bar, or on a plurality thereof.

Instead of using the core described, I employ in some cases a shell (not shown) of sheet material to be contracted centripetally when required to facilitate installation and removal, its edges being if required stiffened longitudinally, and connected and secured by a suitable locking bar.

The mould M of the centrifugal machine is plain or ornamental, and has a shell 33. Or instead of a plain shell 33, ornamental sheet material may be adopted having suitably contoured edges, and be constructed so as to be capable of expansion for instalment and removal, the configuring parts 34 constituting integral or other fittings. When the core is unsegmented these parts are advantageously made entire, and recessed, to provide an annular housing for the shell.

The mould may be in cross section circular, oval, or irregular. The shell 33 is constructable of sections or arcs, and is provided with configuring parts 34 to produce the external design of the agglomerate structure. This shell is at will sectioned longitudinally, so that intermediate of parts 34 other configuring parts may be employed, as for the production of ornamental structures.

Parts 34 have bevelled surfaces 52, and bolt flanges 53. There are cramping rings 54, having bevelled surfaces, drawn or forced over the co-acting surfaces on parts 34, and held by bolts 55 secured by nuts.

Longitudinal edges of arcs are shown butt jointed at 56, and stiffened with angle irons 57, which carry half wedge blocks 58. As shown blocks are tapered at 59 and are held by clamps 60, having means, shown as wedging faces, to secure the mould parts together.

The mould is provided at will with means to facilitate its removal and replacement.

Referring to Figure 2 I provide annulus A with clutch transmission gear of any approved type, and while a friction clutch is therein shown a tooth or other clutch may be adopted, the teeth engaging in recesses 44 of annulus A, Figures 1 and 3.

In Figures 1 to 3 the annulus A is fitted at the driving end with a friction clutch element 19 having a collecting chamber, 61, to receive effluent through annuli apertures 62.

The clutch element 19 has drainage apertures 63, and effluent ducts 64, one at each end, so that a scoop 65 in each case impinges on the inner surface of the collecting chamber, and receives effluent carried thereto by centrifugal force, the ducts 64 leading the effluent to any convenient points of discharge. The use of collecting chamber 61 in clutch element 19 is subject to the use of a clutch as illustrated; when a toothed clutch is employed the annuli A Figures 1, 2 can be the same at each end of the rotor.

The upper part 66 (Figure 3) of duct 64 preferably telescopes with the lower part 67, and is provided with a limiting collar 68 resting on a collar 69. Part 66 is thus rotatable and easily detachable. The duct is pivotally mounted, as on bolt 70 in a bracket 71, on a pedestal P; if desired there is a yielding member as a coiled spring, (not shown) to hold the scoop against the interior surface of the collecting chamber.

Referring to Figures 16 to 18 I show reinforcement retainer gripping means. These means are rings 153 (see also Figure 21) formed in arcs 72 pivotally united by bolts passed through holes 73, and fixed as by nuts. The outer edge of each ring 153 may be returned to overlie the seat recess 74 in Figure 21, which is subsequently occupied by configuring parts 34. Each arc 72 is of L or other suitable cross section, to one end of which an overlapping plate 75 is riveted, to receive the other (or unfurnished) end of an adjoining arc.

I provide, see Figures 17 and 18, retainer plates 76 contoured to suit the retainers, and spaced to provide gaps or recesses 77, to receive and hold retainer ends in position during superposing of the reinforcement R. The ends of the latter are suitably secured, as in each case by passing them through any suitable hole or holes y, see Figure 16. Although other holding means are usable, Figures 16 and 17 show a device for temporarily holding an end of reinforcement R, prior to cutting it from the supply reel, to allow of securing the said end. Secured to each arc 72 is a fitting 78 having a rough surface 79, eccentric to a pivot 80 which carries a lever 81 having a jaw face 82, which is rough to co-act with surface 79, to hold reinforcement R temporarily, the lever being secured, as by a link 83 pivoted at 84.

As a modification of the arrangement of the reinforcement, and retainers, a reinforcement is coiled or shaped on any suitable withdrawable or collapsible core of the required diameter and retainers, arranged to superpose the reinforcement coil, are secured thereto in any suitable way,—conveniently while the latter is on the forming core. A cage is thus constructed which is inserted within the mould of the centrifugal machine, with the retainer pieces contacting with the interior of the same, and thus positioning the reinforcement. In this arrangement the core C can be dispensed with if desired.

In any instance the reinforcement and the ferruginous members of the retainers may be united by welding electrically or any other method.

To provide for variation in alignment of the rotor with its driving gear, I mount the clutch gear on a supported shaft designedly in line with, but independent of, shaft 2; and insert any suitable flexible coupling between the meeting ends of the shafts.

It is obvious that a plurality of my centrifugal machines could be installed in line, and be geared to operate simultaneously.

The rotor is then suitably rotated, and during this process agglomerate material is supplied to the core C, passing through the apertures 40 into the moulding space there, embedding the retainers D and the reinforcement R. When this space is sufficiently filled, the rotor is further revolved, and fast enough to consolidate the agglomerate material, and expel moisture thus expressible.

To allow space for forming a smooth inner face on the structure, said space may be incompletely filled with the agglomerate, and the remaining space may be supplied with neat cement or like material to produce smoothness, which is of value in those structures, such as pipes, in which low resistance to fluid flow is desirable.

During the subjection of the constructional material to centrifugal force, owing to the specific gravity of the constituents of the material, the aqueous constituent flows centripetally through ports 40, and apertures 62 into the collecting chambers 61, in each of which it is intercepted by scoop 65 and passes through duct 64 to any convenient point of discharge.

When the consolidation has been completed the duct scoops can be moved clear, and the rotor transferred to any suitable staging, where annuli A may be removed, and if desired the moulded structure set on end, to rest or dry on a seat S and subsequently the locking bars F, core C, rings 54, upper seat S (when the rotor is set on end) and mould M.

The order in which these elements are removed may be reversed or varied at will.

A scraper or other suitable tool can be employed to remove or otherwise deal with surplus internal agglomerate, so as to leave a dressed and finished surface.

The concrete structure can be left standing further on the lower seat S, or can be laid on a suitable trestle or bearer as preferred, to harden and dry, or it may be transferred to a steaming chamber, or hydraulic seasoning tank as desired. By allowing the structure to remain on the seat damage to its jointing surface is avoidable.

For controlling supply and distribution of agglomerate to the rotor, a spiral or screw conveyor is usable, rotating within a tube or trough, arranged to be reciprocated or advanced and withdrawn, operated by rack gear as will be readily understood, though it is not illustrated, such a conveyor being well known.

There is a suitable supply hopper to feed agglomerate into the tube interior through one or more ports in the tube. The conveyor receives agglomerate from the hopper during reciprocations of the tube, the agglomerate being thus fed into the rotor, and distributed therefrom. During this distribution the rotor is rotated at any suitable speed or speeds.

I claim:—

1. In apparatus of the kind specified an end annulus having effluent apertures in combination with a clutch portion having effluent apertures and an effluent collecting chamber.

2. In apparatus for forming agglomerate structures, a clutch portion having an effluent collecting chamber.

3. In an apparatus for forming agglomerate structures, a clutch portion having an effluent collecting chamber, and means for delivering effluent therefrom.

4. In apparatus for forming agglomerate structures, a clutch portion having an effluent collecting chamber, and effluent delivery means in contact with the inner surface of said chamber.

5. In apparatus for forming agglomerate structures, a clutch portion having an effluent collecting chamber and an effluent delivery duct having its upper end in contact with the inner surface of said chamber.

6. In apparatus for forming agglomerate structures, a clutch portion having an effluent collecting chamber, and a movably mounted effluent delivery duct adapted to receive effluent therefrom.

7. In apparatus for forming agglomerate structures, a clutch portion having an effluent chamber, and effluent delivery duct provided with an upper detachable part adapted to engage the inner surface of said chamber, and means for supporting said duct.

8. In apparatus for forming agglomerate structures, a clutch portion having an effluent chamber, a lower duct section, means for supporting the same, and an upper duct section removably mounted on the lower section and in contact with the inner surface of said chamber.

9. In apparatus for forming agglomerate structures, a clutch portion having an effluent chamber, a lower duct section, means for supporting the same, and an upper duct section removably, rotatably and telescopically mounted on said lower section and having its free end provided with a scoop adapted to engage the inner wall of said effluent chamber to receive effluent therefrom and guide it into said duct.

10. In apparatus for forming agglomerate structures, a revoluble annulus, a pair of stationary rollers, horizontally spaced and disposed to support said annulus from below, a pair of rollers pivotally mounted above said stationary rollers and adapted to be swung toward and from the axis of said annulus to engage and position annuli of different diameters, means for limiting the movement of said pivoted rollers, and means for locking said pivoted rollers in adjusted positions.

11. An apparatus for forming agglomerate structures comprising, a pair of revoluble annuli, a seat carried by each annulus, a second annulus carried by each seat, a mould cylinder carried by said second annuli, and a core carried by said seats.

12. An apparatus for forming agglomerate structures comprising, a pair of revoluble annuli, a seat carried by each annulus, a second annulus carried by each seat, a mould carried by said second annuli, and a core carried by said seats and comprising a plurality of arcuate sections, interior strengthening ribs for said sections, and wedging means for connecting said sections.

13. In apparatus for forming agglomerate structures, a core comprising a plurality of arcuate sections, interior strengthening ribs therefor, and wedge connections between said sections.

14. In apparatus for forming agglomerate structures, an annulus, a clutch member adapted to engage the same, a pivotally mounted arm for actuating said clutch, and worm gearing for actuating said arm.

15. In apparatus for forming agglomerate structures, an annulus, a clutch member adapted to engage the same, a pivotally mounted arm connected to said clutch member and provided with a worm gear, and a worm wheel adapted to intermesh with said worm gear to actuate said arm.

16. In apparatus for forming agglomerate structures, a pair of opposed seats, a core comprising a plurality of sections each having opposite ends seated in said seats, and a plurality of locking bars carried by said seats and cooperating with said sections to secure the same in operative position.

17. In apparatus for forming agglomerate structures, a pair of opposed seats, a core comprising a plurality of sections each having opposite ends seated in said seats, a plurality of locking bars carried by said seats and cooperating with said sections to secure the same in operative position, and wedging elements carried by said bars and adapted to engage said core sections and force them to operative position.

18. In apparatus for forming agglomerate structures, a pair of opposed seats, a perforated core having its opposite ends seated in said seats, a mold supporting annulus carried by each seat and concentric therewith, a mold comprising a plurality of longitudinal sections each having its opposite ends seated in said annuli, and means for clamping said sections together about the aforesaid core in spaced relation thereto.

In witness whereof I have hereunto set my hand.

CHARLES WILLIAM WATSON.